United States Patent [19]

Lin

[11] Patent Number: 6,167,347
[45] Date of Patent: Dec. 26, 2000

[54] VEHICLE POSITIONING METHOD AND SYSTEM THEREOF

[76] Inventor: Ching-Fang Lin, 9131 Mason Ave., Chatsworth, Calif. 91311

[21] Appl. No.: 09/246,883

[22] Filed: Feb. 8, 1999

Related U.S. Application Data

[60] Provisional application No. 60/107,147, Nov. 4, 1998.

[51] Int. Cl.[7] .............................. G01C 21/00; H04B 7/185
[52] U.S. Cl. ....................... 701/214; 701/207; 701/213; 342/357.01; 342/450; 342/451
[58] Field of Search ..................................... 701/200, 207, 701/213, 214, 215, 216, 220, 225, 300; 342/357.01, 357.02, 357.03, 357.04, 357.05, 357.06, 450, 451

[56] References Cited

U.S. PATENT DOCUMENTS 5,654,890  8/1997  Nicosia et al. ......................... 364/428
5,657,025  8/1997  Ebner et al. ....................... 342/357.01
5,757,316  5/1998  Buchler ............................. 342/357.01

Primary Examiner—William A. Cuchlinski, Jr.
Assistant Examiner—Yonel Beaulieu
Attorney, Agent, or Firm—Raymond Y. Chan; David and Raymond

[57] ABSTRACT

An improved fully-coupled vehicle positioning process and system thereof can substantially solve the problems encountered in global positioning system-only and inertial navigation system-only, such as loss of global positioning satellite signal, sensibility to jamming and spoofing, and inertial solution's drift over time, in which the velocity and acceleration from an inertial navigation processor are used to aid the code and carrier phase tracking of the global positioning system satellite signals, so as to enhance the performance of the global positioning and inertial integration system, even in heavy jamming and high dynamic environments. The improved fully-coupled GPS/IMU vehicle positioning system includes an IMU (inertial measurement unit) and a GPS processor which are connected to a central navigation processor to produce navigation solution that is output to an I/O (input/output) interface.

19 Claims, 7 Drawing Sheets

VEHICLE POSITIONING METHOD AND SYSTEM THEREOF

CROSS REFERENCE OF RELATED APPLICATION

This is a regular application of a provisional application having an application number of 60/107,147 and a filing date of Nov. 4, 1998.

FIELD OF THE PRESENT INVENTION

The present invention relates generally to a global positioning system and inertial measurement unit (GPS/IMU) integrated positioning and navigation method, and more particularly to an improved fully-coupled integration method of the global positioning system (GPS) receiver and the inertial measurement unit (IMU), which allows the mutual aiding operation of the global positioning system (GPS) receiver and the inertial navigation system (INS) at an advanced level with features of inertial aiding global positioning system satellite signal tracking and rapid global positioning system signal carrier phase integer ambiguity resolution.

BACKGROUND OF THE PRESENT INVENTION

The global positioning system user equipment, which consists of an antenna, a signal processing unit, and associated electronics and displays, receives the signals from the global positioning system satellites to obtain position, velocity, and time solution. The global positioning system principle of operation is based on range triangulation. Because the satellite position is known accurately via ephemeris data, the user can track the satellite's transmitted signal and determine the signal propagation time. Since the signal travels at the speed of light, the user can calculate the geometrical range to the satellite. The actual range measurement (called the pseudorange) contains errors, for example, bias in the user's clock relative to global positioning system reference time. Because atomic clocks are utilized in the satellites, their errors are much smaller in magnitude than the users' clocks. Thus, for three-dimensional position determination, and also to calculate the cock bias, the pure global positioning system needs a minimum of four satellites to obtain a navigation solution.

Global positioning system GPS contains a number of error sources: the signal propagation errors, satellites errors, and the selective availability. The user range error (URE) is the resultant ranging error along the line-of-sight between the user and the global positioning system satellite. Global positioning system errors tend to be relatively constant (on average) over time, thus giving global positioning system long-term error stability. However, the signals of the global positioning system may be intentionally or unintentionally jammed or spoofed, or the global positioning system (GPS) receiver antenna may be obscured during vehicle attitude maneuvering, and the global positioning system signals may be lost when the signal-to-noise ratio is low and the vehicle is undergoing highly dynamic maneuvers.

An inertial navigation system (INS) is made up by an onboard inertial measurement unit, a processor, and embedded navigation software(s). The positioning solution is obtained by numerically solving Newton's equations of motion using measurements of vehicle specific forces and rotation rates obtained from onboard inertial sensors. The onboard inertial sensors, consisting of accelerometers and gyros, together with the associated hardware and electronics comprise the inertial measurement unit, IMU.

The inertial navigation system may be mechanized in either a gimbaled or a strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Possible navigation frames include earth centered inertial (ECI), earth-centered-earth-fix (ECEF), locally level with axes in the directions of north, east, down (NED), and locally level with a wander azimuth. In a strapdown inertial navigation system, the inertial sensors are rigidly mounted to the vehicle body frame, and a coordinate frame transformation matrix (analyzing platform) is used to transform the body-expressed acceleration and rotation measurements to a navigation frame to perform the navigation computation in the stabilized navigation frame.

Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems become the predominant mechanization due to their low cost and reliability.

Inertial navigation systems, in principle, permit pure autonomous operation and output continuous position, velocity, and attitude data of vehicle after initializing the starting position and initiating an alignment procedure. In addition to autonomous operation, other advantages of inertial navigation system include the full navigation solution and wide bandwidth. However, an inertial navigation system is expensive and subject to drift over an extended period of time. It means that the position error increases with time. This error propagation characteristic is primarily caused by its inertial sensor error sources, such as gyro drift, accelerometer bias, and scale factor errors.

The inherent drawbacks of a stand-alone inertial navigation system (INS) and a stand-alone global positioning system (GPS) show that a stand-alone inertial navigation system or a stand-alone global positioning system can not meet mission requirements under some constraints such as low cost, high accuracy, continuous output, high degree of resistance to jamming and high dynamic.

In the case of integration of global positioning system with inertial navigation system, the short term accuracy of the inertial navigation system and the long term stability and accuracy of global positioning system directly complement each other.

One of the conventional integration approaches of global positioning system and inertial navigation system is to reset directly the inertial navigation system with global positioning system-derived position and velocity. The second approach is the cascaded integration where the global positioning system-derived position and velocity are used as the measurements in an integration Kalman filter. The third approach uses an extended Kalman filter processes the raw pseudorange and delta range measurements of the global positioning system to provide optimal navigation parameter error estimates of the inertial navigation system, inertial sensor errors, and the global positioning system receiver clock offset.

The shortcomings of the above existing integration approaches are:

1. In the conventional global positioning system and inertial navigation system integration approaches, only position and velocity derived by global positioning system receiver or global positioning system raw pseudorange and delta range measurements are used. In fact, the raw carrier phase measurements of global positioning system have the highest measurement accuracy, but are not employed to contribute to an integration solution.

2. A significant impediment to the aiding of global positioning system signal tracking loops with inertial navigation system is that the aiding causes the potential instability of the conventional global positioning system and inertial navigation integration system. The reason is that there is a positive feedback signal loop in the combined global positioning and inertial system. The accuracy degradation of the inertial aiding data increases the signal tracking errors. The increased tracking errors fed to the inertial system may cause further degradation of inertial system, because the measurements may severely affect the Kalman filter, which is well tuned for a low accuracy inertial navigation system.

3. In conventional tightly-coupled global positioning and inertial integration system, low accurate inertial sensor can not provide global positioning system satellite signal carrier phase tracking with velocity aiding, because the aiding of carrier phase tracking loop requires high accuracy of external input velocity.

SUMMARY OF THE PRESENT INVENTION

It is a main objective of the present invention to provide an improved fully-coupled vehicle positioning process and system thereof, in which the velocity and acceleration from an inertial navigation processor are used to aid the code and carrier phase tracking of the global positioning system satellite signals, so as to enhance the performance of the global positioning and inertial integration system, even in heavy jamming and high dynamic environments.

It is another objective of the present invention to provide an improved fully-coupled vehicle positioning process and system thereof, in which the velocity and acceleration from an inertial navigation processor corrected by a Kalman filter are used to aid the code and carrier phase tracking of the global positioning system satellite signals, so as to enhance the performance of the global positioning and inertial integration system, even in heavy jamming and high dynamic environments.

It is another objective of the present invention to provide an improved fully-coupled vehicle positioning process and system thereof, in which the velocity and acceleration from an inertial navigation processor are used to aid the code and carrier phase tracking of the global positioning system satellite signals to prevent loss of satellite signal and carrier phase clips encountered in a global positioning system receiver.

It is another objective of the present invention to provide an improved fully-coupled vehicle positioning process and system thereof, in which the velocity and acceleration from an inertial navigation processor corrected by a Kalman filter are used to aid the code and carrier phase tracking of the global positioning system satellite signals to prevent loss of satellite signal and carrier phase clips encountered in a global positioning system receiver.

It is another objective of the present invention to provide an improved fully-coupled vehicle positioning process and system thereof, in which the inertial navigation system aids the satellite signal integer ambiguity resolution of the global positioning system by providing more accurate position information.

It is a further objective of the present invention to provide an improved fully-coupled vehicle positioning process and system thereof, in which the integrated navigation solution of global positioning system and inertial measurement unit aids the satellite signal integer ambiguity resolution of the global positioning system by providing more accurate position information and error covariance matrix.

It is another objective of the present invention to provide an improved fully-coupled vehicle positioning process and system, thereof in which the satellite signal carrier phase measurements are used in the Kalman filter, as well as the pseudorange and delta range of the global positioning system, so as to improve the accuracy of integration positioning solution.

Another objective of the present invention is to provide an improved fully-coupled vehicle positioning process and system thereof, in which a Kalman filter is implemented in real time to optimally blend the global positioning system raw data and the inertial navigation solution, and to estimate the navigation solution.

Another further objective of the present invention is to provide an improved fully-coupled vehicle positioning process and system thereof, in which a robust Kalman filter is implemented in real time to eliminate the possible instability of the integration solution.

Another objective of the present invention is to provide an improved fully-coupled vehicle positioning process and system thereof, in which a low accurate inertial sensor is used for achieving a high accurate integration solution due to the aiding of global positioning system measurement.

In order to accomplish the above objectives, the present invention provides an improved fully-coupled vehicle positioning process and system thereof, which can substantially solve the problems encountered in global positioning system-only and inertial navigation system-only, such as loss of global positioning satellite signal, sensibility to jamming and spoofing, and inertial solution's drift over time.

The present invention also features with a Kalman filter used for blending the measurements from a global positioning system receiving set and an inertial sensor.

The present invention further features with a robust Kalman filter used for blending the measurements from a global positioning system receiving set and an inertial sensor.

This method can substantially solve the problem of instability present in many existing systems where a Kalman filter is used to perform optimal estimation.

The present invention supports high precision navigation in general aviation and space applications. It can also be used for ground motion vehicles tracking and navigation applications.

DETAILED DESCRIPTION OF THE PRESENT EMBODIMENT

Figure 1:
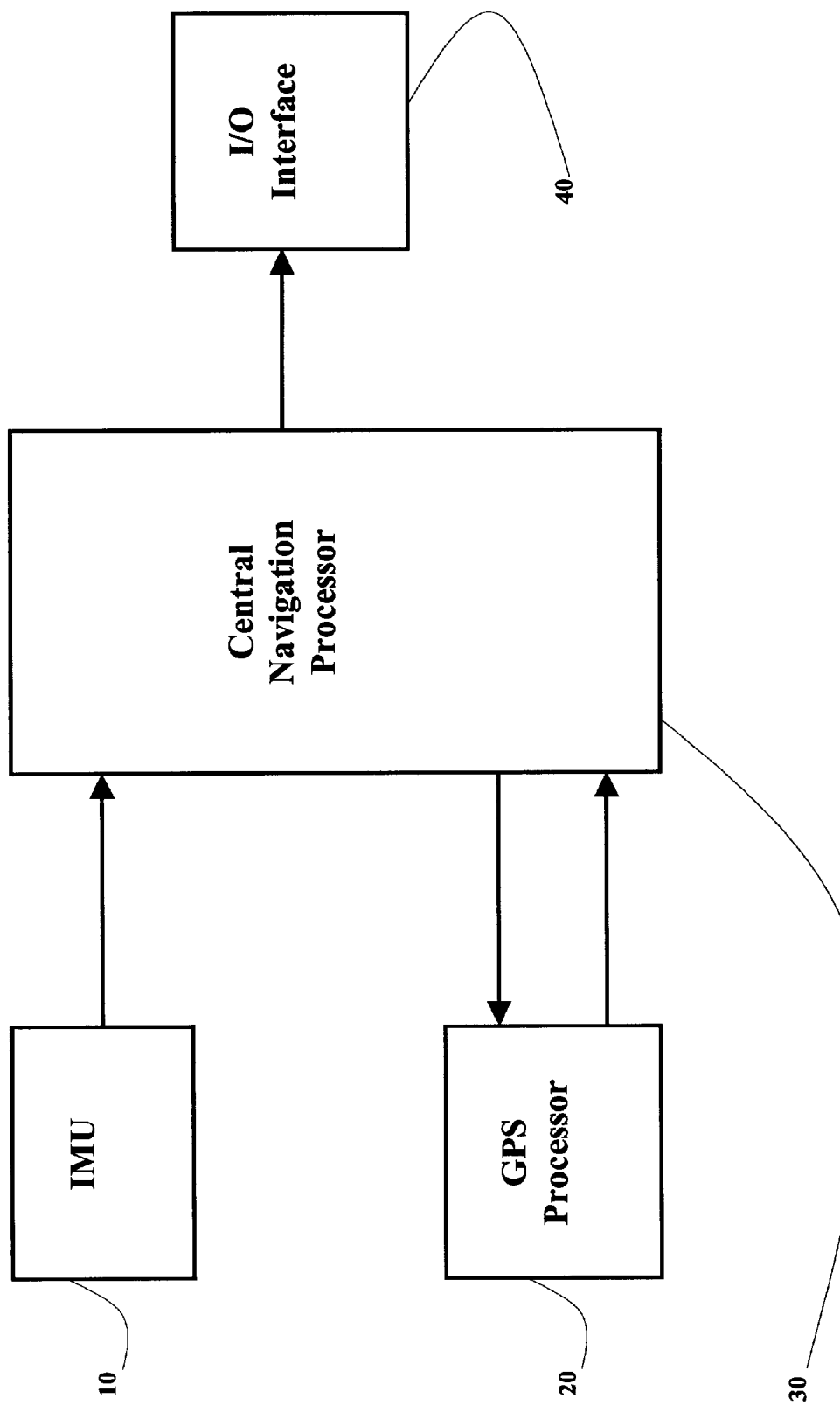
FIG. 1 is a block diagram illustrating an improved fully-coupled vehicle positioning process and system according to a preferred embodiment of the present invention, in which the global positioning system measurement and the inertial measurement are blended in a central navigation processor.

The improved fully-coupled GPS/IMU vehicle positioning system of the present invention, as shown in FIG. 1, comprises an IMU (inertial measurement unit) 10 and a GPS (global positioning system) processor 20 which are connected to a central navigation processor 30. The navigation solution is output to an I/O (input/output) interface 40.

Figure 4:
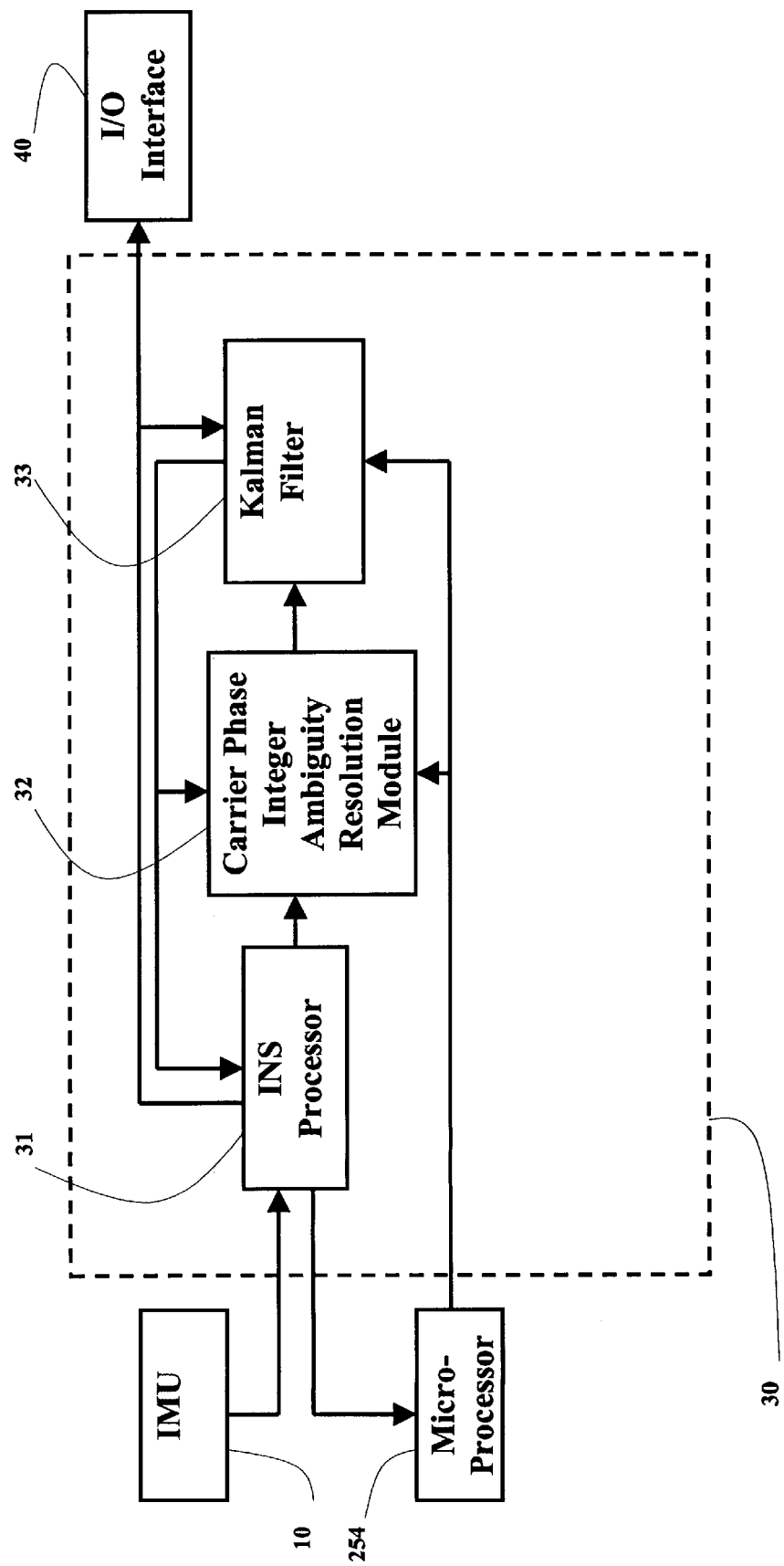
FIG. 4 is a block diagram of the central integrated navigation processing, including the global positioning system and the inertial sensor, according to the above preferred embodiment of the present invention.

The improved fully-coupled global positioning system/inertial measurement unit (GPS/IMU) vehicle positioning process of the present invention comprises the following steps.

a) Receive GPS measurements, including pseudorange, carrier phase, and Doppler shift, from the GPS processor 20 and pass them to the central navigation processor 30. Receive inertial measurements, including body angular rates and specific forces, from the IMU 10 and inject them into an INS processor 31 (as shown in FIG. 4) of the central navigation processor 30.

b) Blend the output of the INS (inertial navigation system) processor 31 and the GPS measurements in a Kalman filter 33 (as shown in FIG. 4).

c) Feed back the output of the Kalman filter 33 to the INS processor 31 to correct an INS navigation solution.

d) Inject velocity and acceleration data from the INS processor 31 into a micro-processor 254 of the GPS processor 20 to aid the code and carrier phase tracking of the global positioning system satellite signals.

e) Inject the output of the micro-processor 254 of the GPS processor 20, the output of the INS processor 31, the output of the Kalman filter 33 into a carrier phase integer ambiguity resolution module 32 to fix the global positioning system satellite signal carrier phase integer ambiguity number.

f) Output carrier phase integer number from the carrier phase integer ambiguity resolution module 32 into the Kalman filter 33 to further improve the positioning accuracy.

g) Output navigation data from the INS processor 31 to the I/O interface 40. Other on-board avionics systems can get navigation data from the I/O interface 40.

The GPS satellites transmit the coarse acquisition (C/A) code and precision (P) code on radio frequency (RF) at L1 band:

$$S_{l1}(t) = \sqrt{2P_c}\ CA(t)D(t)\cos(\omega_1 t + \phi) + \sqrt{2P_p}\ P(t)D(t)\sin(\omega_1 t + \phi)$$

The GPS satellites transmit the precision (P) code on radio frequency (RF) at L2 band:

$$S_{l2}(t) = \sqrt{2P_2}\ P(t)D(t)\cos(\omega_2 t + \phi_2)$$

where, $\omega_1$ is the L1 radian carrier frequency, $\phi$ is a small phase noise and oscillator drift component, $P_c$ is the C/A signal power, $P_p$ is the P signal power, $D(t)$ is the navigation data, $CA(t)$ is the C/A code, $P(t)$ is the P code, $\omega_2$ is the L2 radian carrier frequency, $P_2$ is the L2-P signal power, $\omega_2$ is a small phase noise and oscillator drift component.

The received signals at the GPS antenna 31 are, respectively:

$$S_{l1}(t) = \sqrt{2P_c}\ CA(t-\tau)D(t)\cos[(\omega_1 + \omega_d)t + \phi)] + \sqrt{2P_p}\ P(t)D(t)\sin[(\omega_1 + \omega_d)t + \phi)]$$

$$S_{l2}(t) = \sqrt{2P_2}\ P(t-\tau)D(t)\cos[(\omega_2 + \omega_d)t + \phi_2)]$$

where, $\tau$ is the code delay, $\omega_d$ is the Doppler radian frequency.

Figure 2:
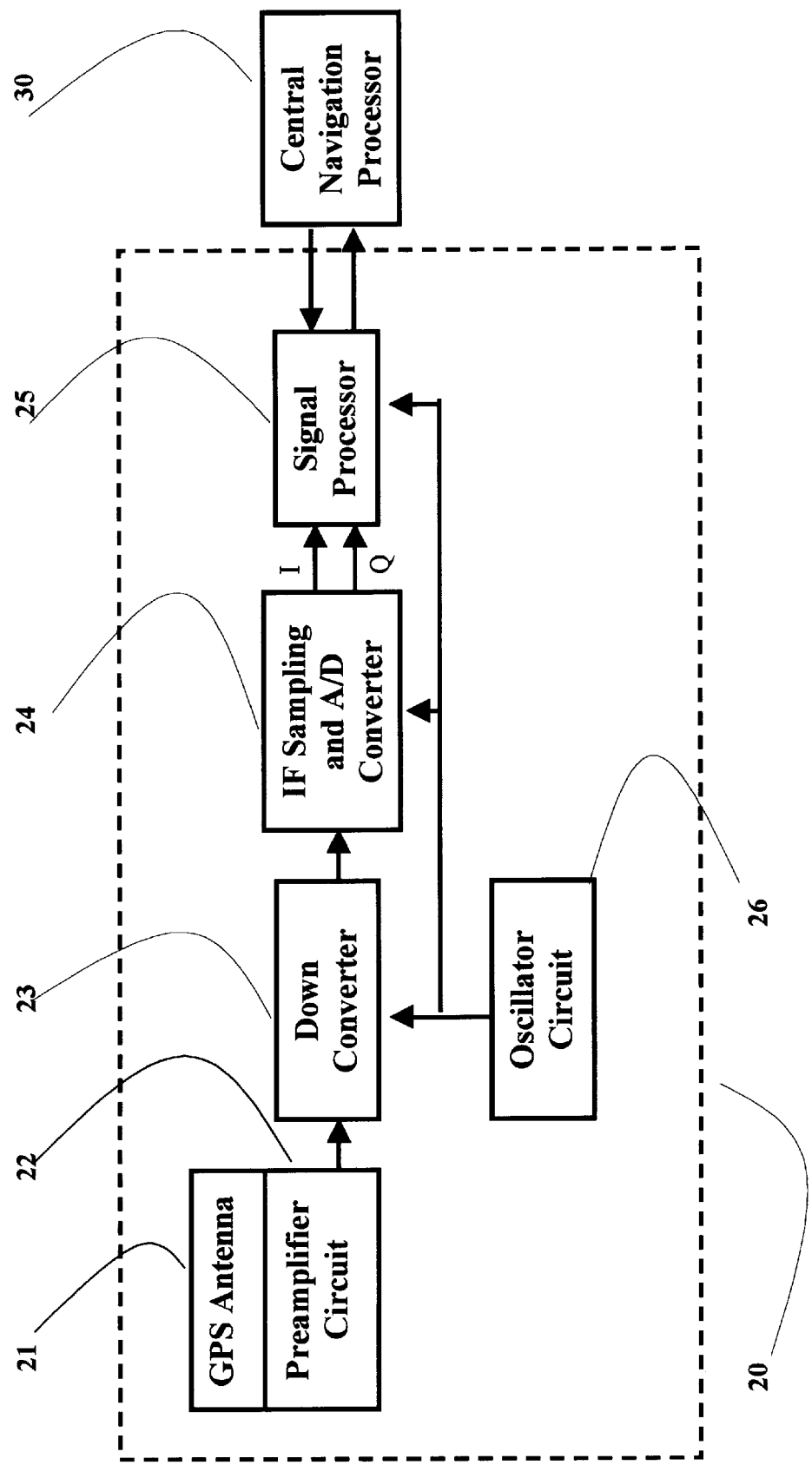
FIG. 2 is a block diagram of the global positioning system processing with external aiding from the central navigation processor according to the above preferred embodiment of the present invention.

Referring to FIG. 2, the GPS processor 20 comprises a GPS antenna 21 to receive GPS signals which are amplified by a preamplifier circuit 22. The amplified GPS signals are then passed to a down converter 23 of the GPS processor 20. The down converter 23 converts radio frequency (RF) signal to intermediate frequency (IF) signal. The IF signal is processed by an IF sampling and A/D converter 24 to convert the IF signal to that of in-phase (I) and quadraphase (Q) components of the signal envelope. In the IF sampling and A/D converter 24, the IF signal is first filtered by a low pass filter, and then sampled, finally converted from analog signal to digital data. The digital data are input into a signal processor 25 to extract the navigation data modulated on the GPS signals, such as the GPS satellite ephemeris, atmosphere parameters, satellite clock parameter, and time information. The signal processor 25 also processes the digital data from the IF sampling and AID converter 24 to derive the pseudorange, carrier phase, and Doppler frequency shift. The GPS processor 20 further comprises an oscillator circuit 26 for providing clock signal to the down converter 23, IF sampling and A/D converter 24, and the signal processor 25.

Figure 3:
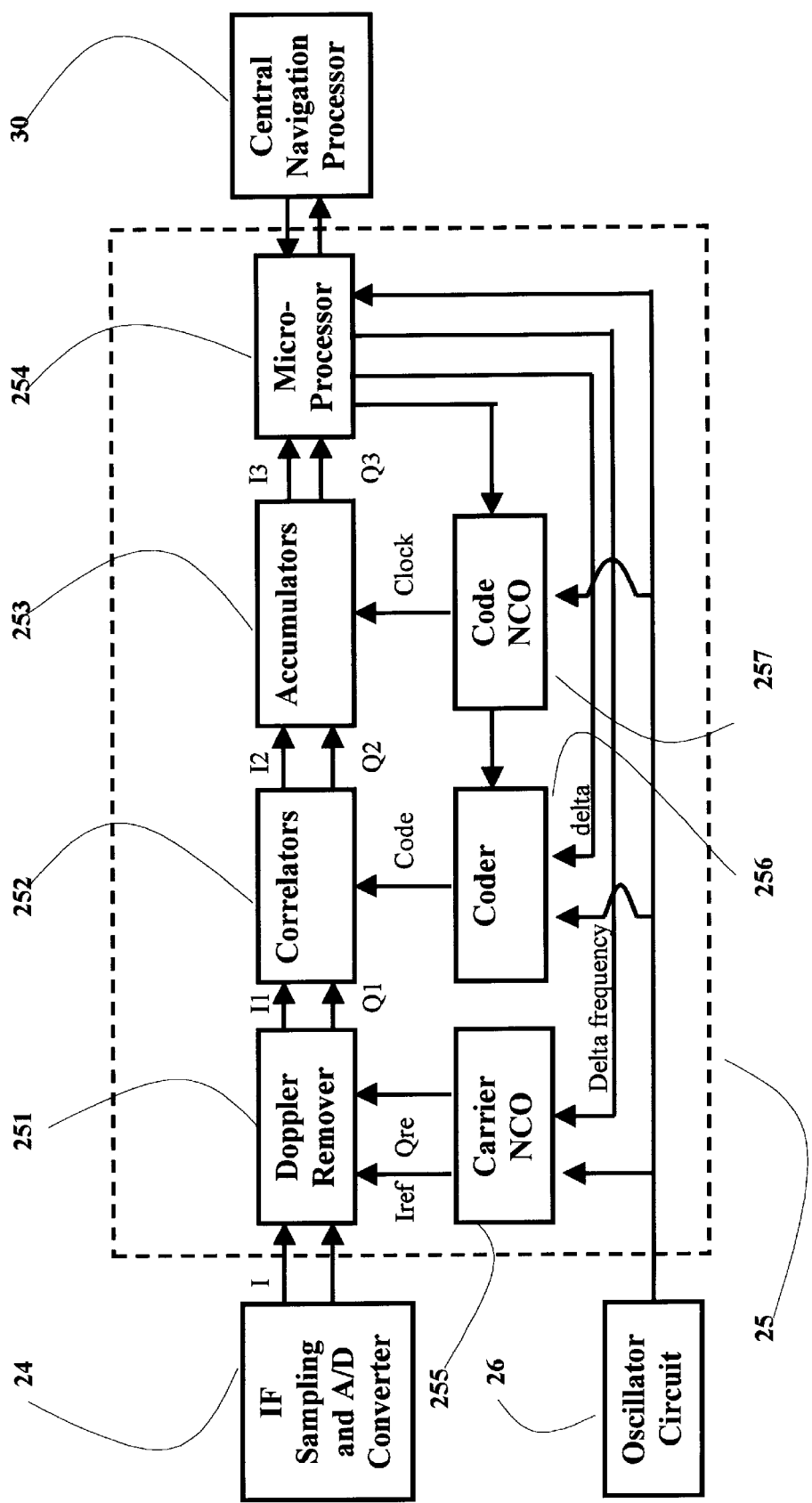
FIG. 3 is a block diagram of the global positioning system signal processing with external aiding from the central navigation processor according to the above preferred embodiment of the present invention.

Referring to FIG. 3, the pseudorange measurements are derived from the GPS code tracking loop which consists of a correlators 252, an accumulators 253, the micro-processor 254, a code NCO (numerical controlled oscillator) 257, and a coder 256. The Doppler shift and carrier phase measurements are obtained from the GPS satellite signal carrier phase tracking loop which consists of a Doppler remover 251, the correlators 252, the accumulators 253, the micro-processor 254, and a carrier NCO (numerical controlled oscillator) 255.

The digital data (I and Q) from the IF sampling and A/D converter 24 is processed by the Doppler remover 251 to remove the Doppler shift modulated on the GPS satellite signal. The Doppler remover 251 is used by the carrier tracking loop to track the phase and frequency of the incoming signal. "The Doppler removal is accomplished with a digital implementation of a single sideband modulator. The carrier NCO 255 accumulates phase at its clocking rate based upon a frequency number input. Every time its accumulator rolls over, a new cycle is generated. The time that it takes to do this is a cycle period."[1] The clock from the oscillator circuit 26 and the delta frequency from the microprocessor 254 drive the carrier NCO 255. The carrier NCO 255 outputs in-phase and quadraphase components of reference phase (Iref and Qref). The reference phase is output to the Doppler remover 251.

The GPS satellite signal after Doppler removal processing is passed to the correlators 252 in which the correlation process is performed. "The accumulators 253 follow the correlators 252 which makes up the postcorrelation processing and filter the correlated signal components (I2 and Q2) prior to processing in the microprocessor 254. The accumulation process is simply the accumulation of the correlated samples over T seconds, where T is usually a C/A code epoch periods of one ms. The accumulations (I3 and Q3) are stored and collected by the microprocessor 254, and the accumulators 253 are dumped, resulting in an accumulated-an-dump filtering of the signal components."[2]

The code used in the correlators 252 comes from the coder 256 which is driven by the clock from the oscillator 26 and the delta delay from the microprocessor 254. The coder 256 is responsible for generation of C/A code and/or P code. The accumulators 253 are driven by the clock generated from a code NCO 257 which is driven by the oscillator circuit 26 and the microprocessor 254. The code NCO 257 also drives the coder 256.

The microprocessor 254 has two working modes: (1) receiving data from the accumulators 253 to perform loop filtering, acquisition processing, lock detection, data recovery, and measurement processing; (2) receiving data from the accumulators 253 and the velocity and acceleration data from navigation processor 30 to perform loop filtering, acquisition processing, lock detection, data recovery, and measurement processing. The second working mode is referred to as velocity-acceleration aiding carrier phase and code tracking.

When the tracking error of GPS signal in the signal tracking loop of the signal processor 25 is larger than the tracking bandwidth of the signal tracking loop, the loss of GPS satellite signal occurs. A loss of lock status of the tracking loop is mainly caused by the low signal-noise ratio (SNR) and Doppler drift of the received satellite signals. The former may be generated by inputting noise or jamming. The latter, Doppler drift, is caused by high-speed movement of the vehicle. Generally, the expansion of the bandwidth of the tracking loop can improve the Phase-Locked Loop (PLL) tracking capability in a high dynamic environment but simultaneously can corrupt anti-interference capability of the GPS receiving set because more unwanted noise signals are allowed to enter the GPS signal tracking loops. The aiding of GPS signals with corrected INS (inertial navigation system) solution is to obtain an optimal trade-off between GPS tracking loop bandwidth and anti-jamming capabilities.

Referring to the second working mode of the microprocessor, the purpose of the corrected INS velocity-acceleration information aided GPS PLL loop is to estimate the carrier phase of the intermediate frequency signal $\theta_I(t)$ rapidly and accurately over a sufficiently short estimation period, and wherein $\theta_I(t)$ is approximated by $$\theta_I(t) = \theta_{I0} + \omega_{I0} t + \gamma_{I0} t^2 + \delta_{I0} t^3 + \ldots$$

The problem now becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\hat{\theta}(t) = b_1 V^{LOS} + b_2 A^{LOS} t^2 + b_3 a^{LOS} t^3 + \Lambda$$

where $(b_1, b_2, b_3)$ are constants related to the carrier frequency and the speed of light, and are given by $$b_1 = \frac{4\pi f_c}{c}, \quad b_2 = \frac{2\pi f_c}{c}, \quad b_3 = \frac{4\pi f_c}{3c}$$

$V^{LOS}, A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 31 and then be incorporated into the loop filter in the microprocessor 254.

The code tracking loop of the signal processing 25 tracks the code phase of the incoming direct sequence spread-spectrum signal. The code tracking loop provides an estimate of the magnitude of time shift required to maximize the correlation between the incoming signal and the internally generated punctual code. This information of time delay is used by the microprocessor 254 to calculate an initial vehicle-to-satellite range estimate, known as the pseudorange. The information of velocity and acceleration coming from the central navigation processor 30 is transformed into the LOS velocity and acceleration ($V^{LOS}$ and $A^{LOS}$) which are used to precisely estimate the code delay. By this way, the dynamic performance and anti-jamming capability are enhanced.

The central navigation processor 30, as shown in FIG. 4, receives the measurements coming from the IMU 10 and the microprocessor 254 of the GPS processor 20, in which the measurements are blended to derive high precision navigation information including 3-dimensional position, 3-dimensional velocity, and 3-dimensional attitude. These data are output from an INS processor 31 of the central navigation processor 30 and are passed to the I/O interface 40. Other avionics systems can read the navigation data from said I/O interface 40. As mentioned before, the velocity and acceleration informations are also fed back to the microprocessor 254 of the GPS processor 20 to aid the global positioning system satellite signal code and carrier phase tracking.

The microprocessor 254 of the GPS processor 20 outputs the pseudornage, Doppler shifts, global positioning system satellite ephemeris, as well as atmosphere parameters to the Kalman filter 33 in which the data from the INS processor 31 and the microprocessor 254 of the GPS processor 20 are integrated to derive the position error, velocity error, and attitude error. The INS processor 31 processes the inertial measurements, which are body angular rates and specific forces, and the position error, velocity error, and attitude error coming from the Kahnan filter 33 to derive the corrected navigation solution. The navigation solution includes 3-dimensional position, 3-dimensional velocity, and 3-dimensional attitude. These data are output into the Kalman filter 33. On the other hand, these data are also passed to the I/O interface 40 which provides a navigation data source for other avionics systems on board a vehicle where these avionics systems need navigation data or part of these data.

Figure 5:
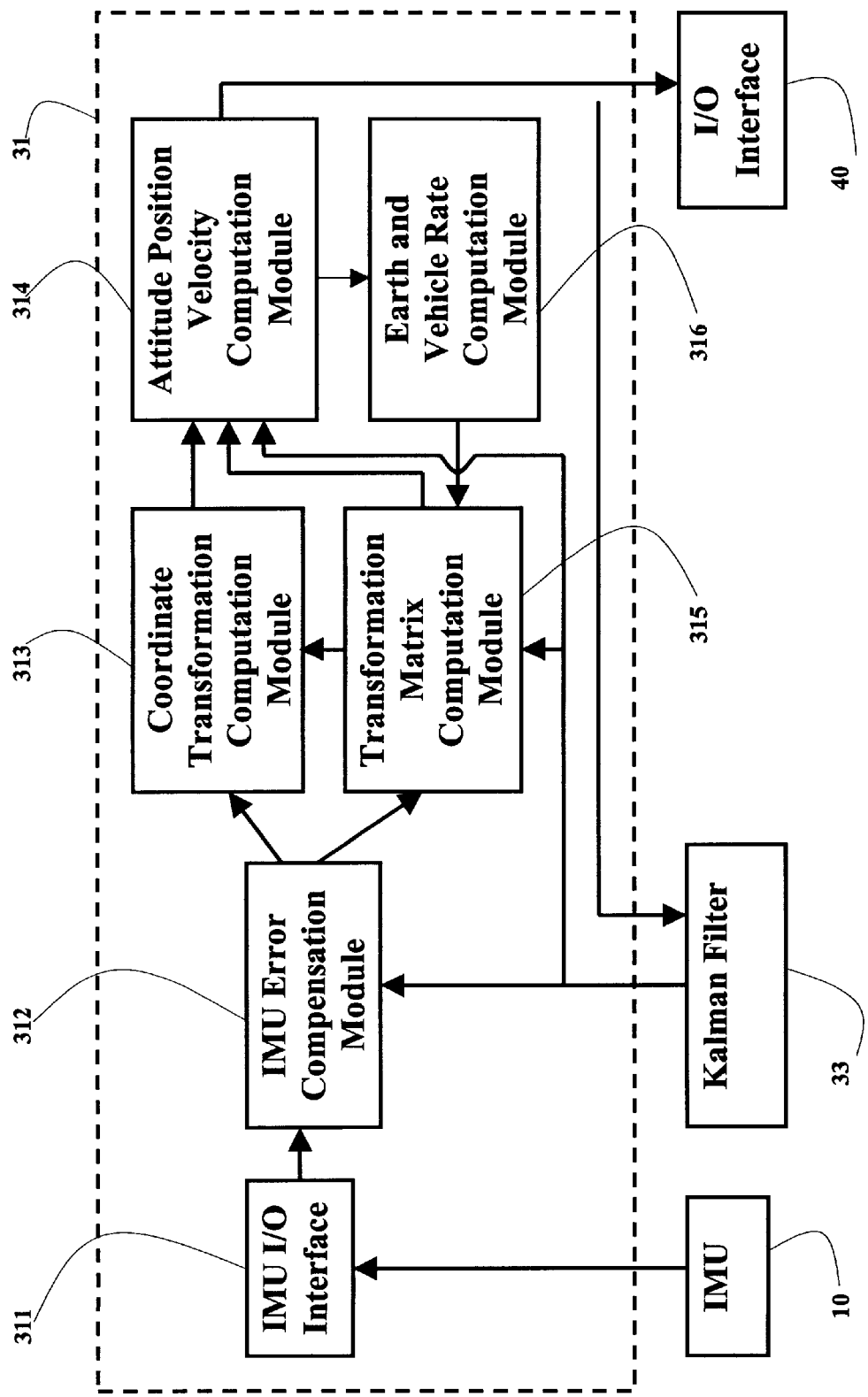
FIG. 5 is a block diagram of the inertial navigation system processing, which receives the navigation state corrections from a Kalman filter according to the above preferred embodiment of the present invention.

Referring to FIG. 5, the INS processor 31 comprises an IMU I/O interface 311, an IMU error compensation module 312, a coordinate transformation computation module 313, an attitude position velocity computation module 314, a transformation matrix computation module 315, and an earth and vehicle rate computation module 316.

The IMU I/O interface 311 collects the signal of the body angular rates and specific forces from the IMU 10 for processing and converting it to digital data. These digital data are corrupted by the inertial sensor measurement errors. These contaminated data are passed to the IMU error compensation module 312. The IMU error compensation module 312 receives the sensor error estimates derived from the Kalman filter 33 to perform IMU error mitigation on the IMU data. The corrected inertial data are sent to coordinate transformation computation module 313 and the transformation matrix computation module 315, where the body angular rates are sent to the transformation A-matrix computation module 315 and the specific forces are sent the coordinate transformation computation module 313.

The transformation matrix computation module 315 receives the body angular rates from the IMU error computation module 312 and the earth and vehicle rate from the earth and vehicle rate computation module 316 to perform transformation matrix computation. The transformation matrix computation module 315 sends the transformation matrix to the coordinate transformation computation module 313 and attitude position velocity computation module 314. The attitude update algorithm in the transformation matrix computation module 315 uses the quaternion method because of its advantageous numerical and stability characteristics. The differential equation of the relative quaternion between the body frame and the local navigation frame is:

$$\dot{q} = 1/2[\Omega_b]q - 1/2[\Omega_n]q$$

where, $q^T = [q_0\ q_1\ q_2\ q_3]$ is a four-component vector of quaternion parameters, and $\Omega_b$ is the skew-symmetric matrix of the vector. $\omega_{ib}^b$, which is sensed by the gyro and is the rotation rate vector of the body frame (b) relative to the inertial frame (i) in the body frame.

$$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix}, \omega_{ib}^b = [\omega_{bx}, \omega_{by}, \omega_{bz}]^T$$

$\Omega_n$ is the skew-symmetric matrix of the vector, $\omega_{in}^n$, which is the rotation rate vector of the local navigation frame (n) relative to the inertial frame in the navigation frame.

$$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix}, \omega_{in}^b = [\omega_{nx}, \omega_{ny}, \omega_{nz}]^T$$

If the navigation frame is the local, level North, East, and Down (NED) navigation frame, then:

$$\omega_{in}^n = \begin{bmatrix} (\omega_e + \dot{\lambda})\cos L \\ -\dot{L} \\ -(\omega_e + \dot{\lambda})\sin L \end{bmatrix}$$

where, $\omega_e$ is the Earth's rotation rate, L is the geodetic latitude, and $\lambda$ is the longitude.

The coordinate transformation module 313 collects the specific forces from the IMU error computation module 312 and the transformation matrix from the transformation matrix computation module 315 to perform the coordinate transformation. The coordinate transformation computation sends the specific forces transferred into the coordinate system presented by the transformation matrix to the attitude position velocity computation module 314.

The attitude position velocity computation module 314 receives the transformed specific forces from the coordinate transformation computation module 313 and the transformation matrix from the transformation matrix computation module 315 to perform the attitude, position, velocity update. A general navigation equation that describes the motion of a point mass over the surface of the Earth or near the Earth has the following form:

$$\dot{V}(t) = a - (2\omega_{ie} + \omega_{en}) \times V - \omega_{ie} \times \omega_{ie} \times r$$

where, a and V are the acceleration and velocity of the vehicle relative to the Earth in the navigation frame, and $\omega_{ie}$ is the Earth rotation vector, $\omega_{en}$ is the angular rate of the navigation frame relative to the earth, and r is the position vector of the vehicle with respect to the Earth's center.

Because the accelerometers do not distinguish between vehicle acceleration and the mass attraction gravity, the specific vector, f, sensed by the accelerometers is:

$$f = a - g(r)$$

where, $g(r)$ is a combination of the earth's gravity and the centrifugal force at the vehicle location. Thus, $$\dot{V}(t) = f - (2\omega_{ie} + \omega_{en}) \times V + g(r)$$

$$\omega_{ie}^n = \begin{bmatrix} \omega_e \cos L \\ 0 \\ -\omega_e \sin L \end{bmatrix}, \omega_{en}^n = \begin{bmatrix} \dot{\lambda}\cos L \\ -\dot{L} \\ -\dot{\lambda}\sin L \end{bmatrix}.$$

The vehicle velocity is updated by the following:

$$\dot{V}^n = C_b^n f^b + MV^n + g^n$$

where, $C_b^n$ is the direction cosine matrix from the body frame to the navigation frame, and $$V^n = \begin{bmatrix} v_n \\ v_e \\ v_d \end{bmatrix}, f^b = \begin{bmatrix} f_{bx} \\ f_{by} \\ f_{bz} \end{bmatrix}, g^n = \begin{bmatrix} 0 \\ 0 \\ g_d \end{bmatrix},$$

$$M = \begin{bmatrix} 0 & -(2\omega_e + \dot{\lambda})\sin L & \dot{L} \\ (2\omega_e + \dot{\lambda})\sin L & 0 & (2\omega_e + \dot{\lambda})\cos L \\ -\dot{L} & -(2\omega_e + \dot{\lambda})\cos L & 0 \end{bmatrix}$$

Using the normal gravity formula for the WGS-84 ellipsoid results in the following expressions:

$$g_d = g_0\left[1 - 2(1 + f + m)\frac{h}{a} + \left(\frac{5}{2}m - f\right)\sin^2 L\right]$$

$$(m = \omega_{ie}^2 a^2 b / GM)$$

where, $g_0$ is the gravity at the equator, $f$ is the elliptical flattening, h is the altitude, a is the semi-major axis value, b is the semi-minor axis value, GM is the earth's gravitational constant.

The differential equations for the position update of the geodetic latitude, L, longitude, λ, and height, h, are given by:

$$\dot{L} = \frac{V_n}{R_M + h}, \dot{\lambda} = \frac{V_e}{(R_N + h)\cos L}, \dot{h} = -v_d$$

where, $R_M$ is the radius of the curvature in the Meridian, $R_N$ is the radius of the prime vertical.

After the computation of the position and velocity, the position and velocity errors calculated by the Kalman filter 33 are used in the attitude position velocity computation module 314 to correct the inertial solution. For the attitude correction, the following two approaches can be applied. First approach is to send the attitude errors computed by the Kalman filter 33 to the attitude position velocity computation module 314 to perform attitude correction in the attitude position velocity computation module 314. The second approach is to send the attitude errors computed by the Kalman filter 33 to the transformation matrix computation module 315 to perform the attitude correction before the attitude position velocity computation module 314.

The corrected inertial solution obtained from the attitude position velocity computation module 314 is passed to the Kalman filter 33 to construct the measurements of the Kalman filter 33. The corrected inertial navigation solution is also send to the carrier phase integer ambiguity resolution module 32 to aid the global positioning system satellite carrier phase integer ambiguity fixing. The corrected velocity and accelerate is passed to microprocessor 254 of the GPS processor 20 to aid the global positioning system satellite signal carrier phase and code tracking. The attitude, position, and velocity information is send to the I/O interface 40 which provides a navigation data source for other avionics systems onboard a vehicle.

The attitude, position, and velocity computed by the attitude position velocity computation module 314 are sent to the earth and vehicle rate computation module 316 to calculate the Earth rotation and the vehicle rotation rate. The calculated Earth and vehicle rates are sent to the transformation matrix computation module 315.

It is well known that the Kalman filter produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the improved fully-coupled GPS/IMU positioning process and system, an alternative for a Kalman filter for position and attitude derivation is a robust Kalman filter. This robust Kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

A robust filter has the characteristic that it provides near-optimum performance over a large class of process and measurement models. The pure Kalman filter is not robust since it is optimal for only one particular process and measurement model. If the filter is not correct the filter covariance may report accuracy which is different from what can actually be achieved. The purpose of filter integrity is to ensure that the predicted performance from the error covariance is close to the actual estimation error statistics. In addition, filter divergence is usually caused by a changing process or measurement model or a sensor failure.

Figure 6:
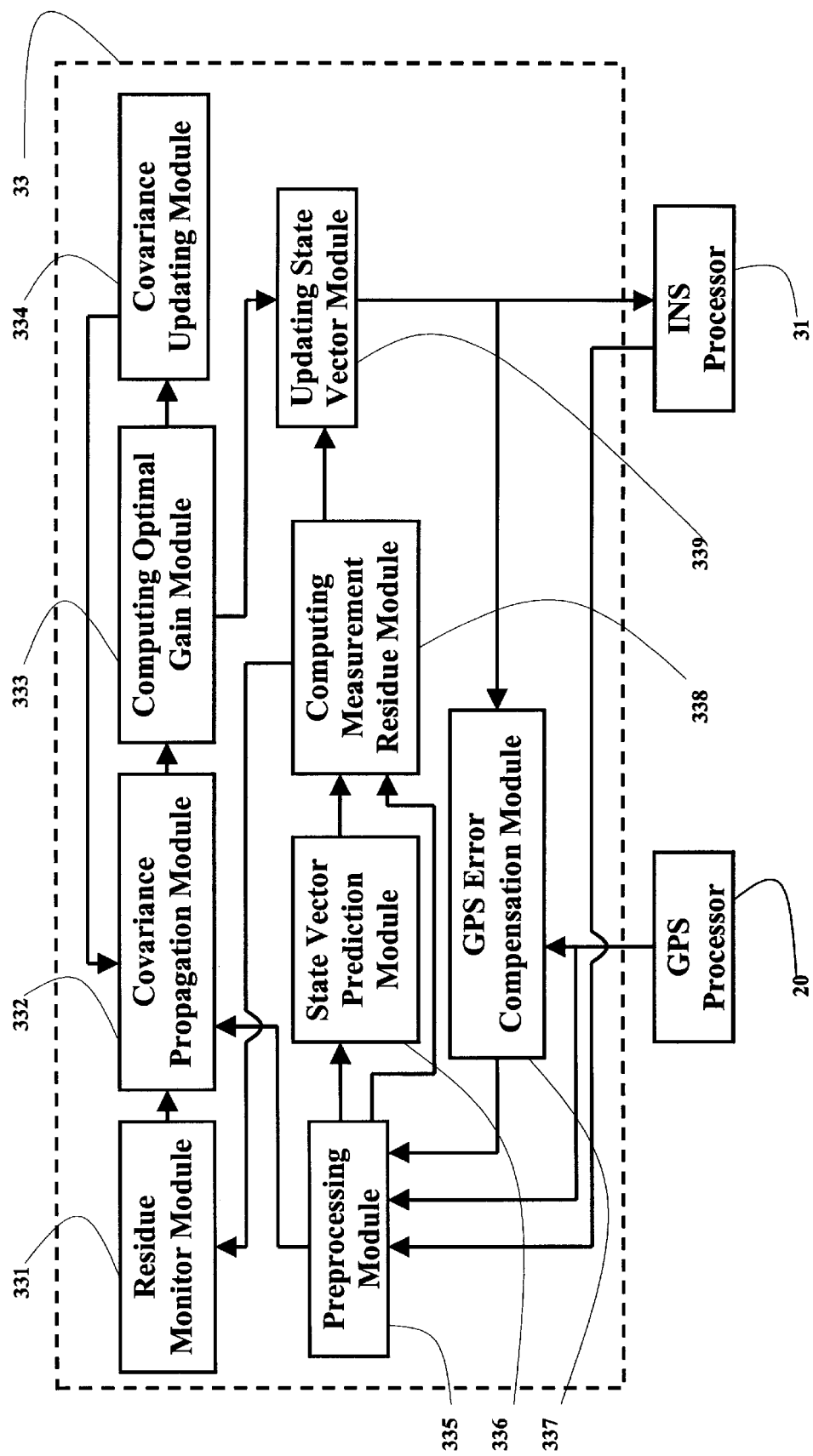
FIG. 6 is a block diagram of the robust Kalman filter implementation according to the above preferred embodiment of the present invention.

This present invention uses a residual monitoring method to obtain a robust Kalman filter which is used to blend the global positioning system raw data and the inertial sensor measurements. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 6 gives the implementation of this robust Kalman filter including a residues monitor function.

As shown in FIG. 6, a GPS error compensation module 337 gathers the GPS raw measurements including pseudorange, carrier phase, and Doppler frequency from the GPS processor 20, and the position and velocity corrections from a updating state vector module 339 to perform GPS error compensation. The corrected GPS raw data are sent to the preprocessing module 335.

A preprocessing module 335 receives the GPS satellite ephemeris from the GPS processor 30, the corrected GPS raw data including pseudorange, carrier phase, and Doppler frequency from a GPS error compensation module 337, and INS solutions from the INS processor 31. The preprocessing module 335 performs the calculation of the state transit matrix and sends it as well as the previous state vector to a state vector prediction module 336. The calculated state transit matrix is also sent to a covariance propagation module 332. The preprocessing module 335 calculates the measurement matrix and the current measurement vector according to the computed measurement matrix and the measurement model. The measurement matrix and the computed current measurement vector are passed to a computing measurement residue module 338.

The state vector prediction module 336 receives the state transit matrix and the previous state vector from the preprocessing module 335 to perform state prediction of current epoch. The predicted current state vector is passed to the computing measurement residue module 338.

The computing measurement residue module 338 receives the predicted current state vector from the state vector prediction module 336 and the measurement matrix and the current measurement vector from the preprocessing module 335. The computing measurement residue module 338 calculate the measurement residues by subtracting the multiplication of the measurement matrix and the predicted current state vector from the current measurement vector. The measurement residues are sent to a residue monitor module 331 as well as the updating state vector module 339.

The residue monitor module 331 performs a discrimination on the measurement residues received from the computing measurement residue module 338. The discrimination law is whether the square of the measurement residues divided by the residual variance is larger than a given threshold. If the square of the measurement residues divided by the residual variance is larger than this given threshold, the current measurement may leads to the divergence of the Kalman filter. When it occurs, the residue monitor module 331 calculates a new covariance of system process or rejects the current measurement. If the square of the measurement residues divided by the residual variance is less than this given threshold, the current measurement can be used by the Kalman filter without changing current covariance of system process to obtain the current navigation solution. The covariance of system process is sent to the covariance propagation module 332.

The covariance propagation module 332 gathers the covariance of system process from the residue monitor module 331, the state transit matrix from the preprocessing module 335, and the previous covariance of estimated error to calculate the current covariance of the estimated error. The computed current covariance of the estimated error is sent to a computing optimal gain module 333.

The computing optimal gain module 333 receives the current covariance of the estimated error from the covariance computing module 332 to compute the optimal gain. This optimal gain is passed to a covariance updating module 334 as well as the updating state vector module 339. The covariance updating module 334 updates the covariance of the estimated error and sends it to the covariance propagation module 332.

The updating state vector receives the optimal gain from the computing optimal gain module 333 and the measurement residues from the computing measurement residue module 338. The updating state vector calculates the current estimate of state vector including position, velocity and attitude errors and sends them to the GPS error compensation module 337 and the INS processor 31.

It is well known that more accurate positioning with GPS is obtained by use of carrier phase measurement than by use of pseudorange measurements only. This is because at the global positioning system satellite L1 broadcasting frequency, 1575.42 MHz, one cycle of carrier is only 19 centimeters as compared to that of one cycle of the C/A code which is around 300 meters. The high accuracy of positioning with GPS carrier phase measurement is based on the prior condition that the phase ambiguities have been solved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is in the presence of satellite ephemeris error, satellite clock bias, atmospheric propagation delay, multi-path effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip is reduced.

Referring to FIGS. 4, the carrier phase integer ambiguity resolution module 32 collects the position and velocity data from the INS processor 31, the carrier phase and Doppler shift measurement from the microprocessor 254 of the GPS processor 20, and the covariance matrix from the Kalman filter 33 to fix the global positioning system satellite signal integer ambiguity number. After fixing of carrier phase ambiguities, the carrier phase ambiguity number is passed to the Kalman filter 33 to further improve the measurement accuracy of the global positioning system raw data.

Figure 7:
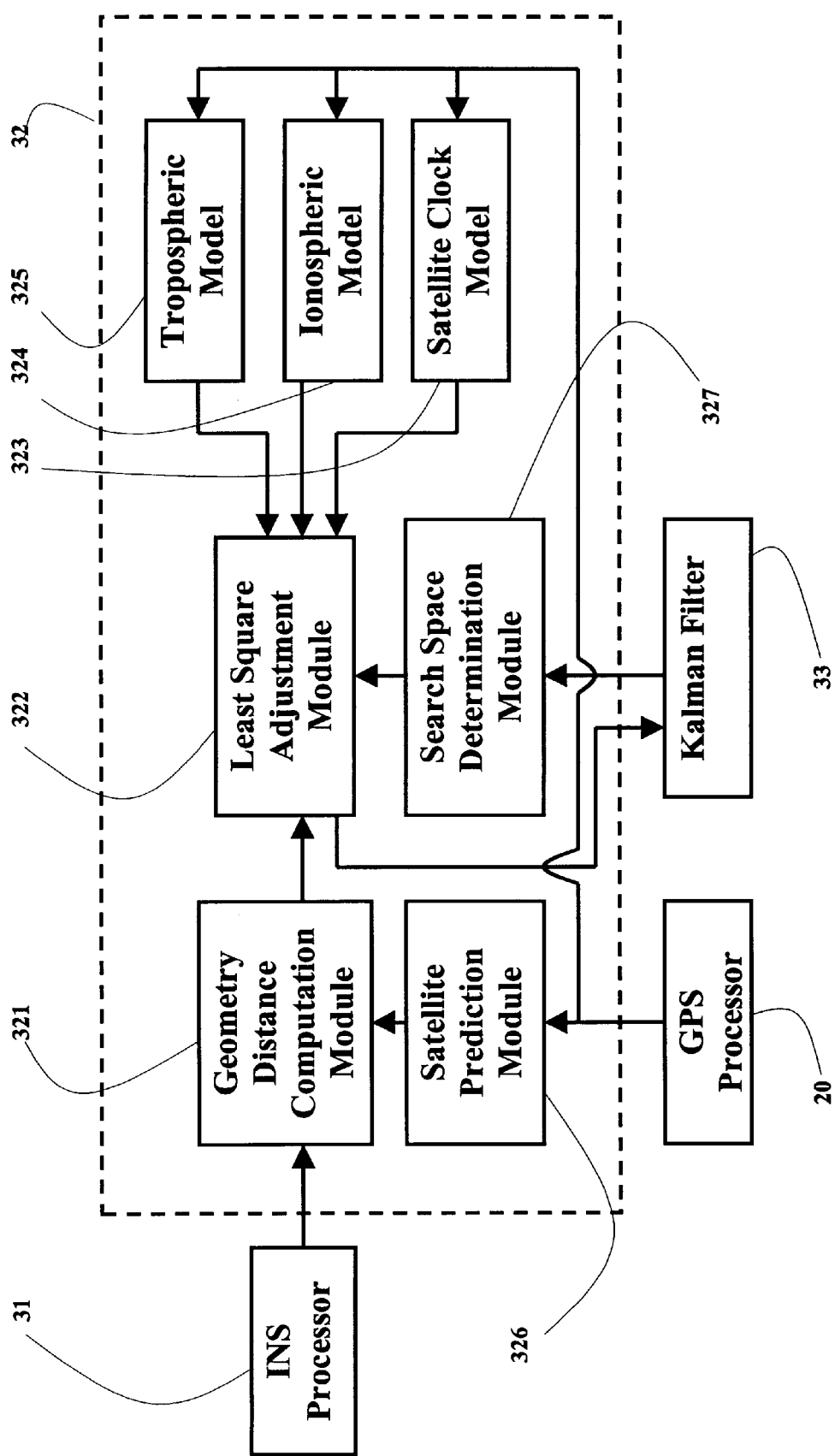
FIG. 7 is a block diagram of the global positioning system satellite signal carrier phase ambiguity resolution with aiding of inertial navigation system according to the above preferred embodiment of the present invention.

The IMU aiding global positioning system satellite signal carrier phase integer ambiguity resolution is given in FIG. 7 which consists of a geometry distance computation module 321, a least square adjustment module 322, a satellite clock model 323, an ionospheric model 324, a tropospheric model 325, a satellite prediction module 326, and a search space determination module 327.

A basic feature of global positioning system satellite signal carrier phase ambiguity is that there is no time dependency as long as tracking is maintained without interruption. The carrier phase measurement can be represented as:

$$\Phi = \frac{1}{\lambda}\rho + f\Delta\delta + N + \frac{d_{eph}}{\lambda} - \frac{d_{iono}}{\lambda} + \frac{d_{trop}}{\lambda} + \varepsilon$$

where, $\Phi$ is the measured carrier phase; $\lambda$ is the signal wavelength; $\rho$ is the true geometric distance between the receiver and satellite; $f$ is the signal frequency; $\Delta\delta=\delta^S-\delta_R$ is the clock error; $\delta^S$ is the satellite clock bias; $\delta_R$ is the receiver error; N is the carrier phase integer ambiguity; $d_{eph}$ is the range error induced by ephemeris error; $d_{iono}$ is the propagation error induced by ionosphere; $d_{trop}$ is the propagation error induced by troposphere; $\varepsilon$ is the phase noise.

When dual frequency is available (using an L1 and L2 dual frequency global positioning system receiver), the dual frequency carrier phase measurements can be used to cancel almost all of the ionospheric error which is the main error source for range measurement. Furthermore, the IMU aiding carrier phase ambiguity resolution is also applied to the wide-lane signal formed between the dual frequency carrier phase measurements. The wide-lane signal can be expressed as $$\Phi_w=\Phi_{L1}-\Phi_{L2}$$

where, $\Phi_{L1}$ is the L1 channel carrier phase measurement; $\Phi_{L2}$ is the L2 channel carrier phase measurement. The corresponding wide-lane frequency and phase ambiguity are $$f_w=f_{L1}-f_{L2}, N_w=N_{L1}-N_{L2}.$$

The problem of fixing carrier phase ambiguity is further complicated by the need to re-determine the ambiguities every time when lock to satellite is lost (this phenomenon is called a cycle slip). The cycle slip must be detected and repaired to maintain high precision navigation solutions. Three sources for cycle slips can be distinguished. First, cycle slips are caused by obstructions of the satellite signal due to trees, buildings, bridges, mountains, etc. This source is the most frequent one. The second source for cycle slips is a low signal-to-noise ratio (SNR) due to bad ionospheric conditions, multi-path, high receiver dynamics, or low satellite elevation. A third source is the receiver oscillator. In this present invention, the IMU aiding is also used for the cycle slip detection and repairing.

The satellite prediction module 326 collects the ephemeris of visible global positioning system satellites from the GPS processor 20 to perform satellite position calculation. The predicted satellite position is passed to the geometry distance computation module 321. The geometry distance computation module 321 receives the vehicle's precision position information from the INS processor 31. Based on the position information of the satellite and the vehicle, the geometrical distance between the satellite and the vehicle is computed by the geometry distance computation module 321 which is different from the pseudorange derived from the code tracking loop of the GPS processor 20. The resolved geometrical distance is sent to the least square adjustment module 322.

The tropospheric model 325 collects the time tag from the GPS processor 326 and calculates the tropospheric delay of the global positioning system satellite signal using the embedded tropospheric delay model. The calculated troposheric delay is sent to the least square adjustment module 322.

The ionospheric model 324 collects the time tag and the ionospheric parameters broadcast by the global positioning system satellite from the GPS processor 20. Using these ionospheric data and the embedded ionospheric delay model, the ionospheric model 324 calculates the minus time delay introduced by the ionosphere. The calculated ionospheric delay is sent to the least square adjustment module 322.

The satellite clock model 323 collects the global positioning system satellite clock parameters to perform the satellite clock correction calculation. The satellite clock correction is also sent to the least square adjustment module 322.

The search space determination module 327 receives the covariance matrix of the measurement vector from the Kalman filter 33. Based on the covariance matrix, the search space determination module 327 derives the measurement error and determine the global positioning system satellite carrier phase integer ambiguity search space. The carrier phase ambiguity search space is sent to the least square adjustment module 322.

The least square adjustment module 322 gathers the geometrical distance from the vehicle to the global positioning system satellite from the geometry distance computation module 321, the tropospheric delay from the tropospheric model 325, the ionospheric delay from the ionospheric model 324, and the satellite clock correction from the satellite clock model 323 to calculate the initial search origin. The least square adjustment module 322 also receives the search space from the search space determination module 327. A standard least square adjustment algorithm applied to the initial search origin and the search space to fix the carrier phase ambiguity.

In view of above, the present invention can provides an improved fully-coupled vehicle positioning process and system thereof to substantially solve the problems encountered in global positioning system-only and inertial navigation system-only, such as loss of global positioning satellite signal, sensibility to jamming and spoofing, and inertial solution's drift over time. The following features and advantages can thus be achieved:

(1) The velocity and acceleration from an inertial navigation processor are used to aid the code and carrier phase tracking of the global positioning system satellite signals, so as to enhance the performance of the global positioning and inertial integration system, even in heavy jamming and high dynamic environments.

(2) The velocity and acceleration from an inertial navigation processor are corrected by a Kalman filter and used to aid the code and carrier phase tracking of the global positioning system satellite signals, so as to enhance the performance of the global positioning and inertial integration system, even in heavy jamming and high dynamic environments.

(3) The velocity and acceleration from an inertial navigation processor are used to aid the code and carrier phase tracking of the global positioning system satellite signals to prevent loss of satellite signal and carrier phase clips encountered in a global positioning system receiver.

(4) The velocity and acceleration from an inertial navigation processor corrected by a Kalman filter are used to aid the code and carrier phase tracking of the global positioning system satellite signals to prevent loss of satellite signal and carrier phase clips encountered in a global positioning system receiver.

(5) The inertial navigation system aids the satellite signal integer ambiguity resolution of the global positioning system by providing more accurate position information.

(6) The integrated navigation solution of global positioning system and inertial measurement unit aids the satellite signal integer ambiguity resolution of the global positioning system by providing more accurate position information and error covariance matrix.

(7) The satellite signal carrier phase measurements are used in the Kalman filter, as well as the pseudorange and delta range of the global positioning system, so as to improve the accuracy of integration positioning solution.

(8) The Kalman filter is implemented in real time to optimally blend the global positioning system raw data and the inertial navigation solution, and to estimate the navigation solution.

(9) The robust Kalman filter is implemented in real time to eliminate the possible instability of the integration solution.

(10) Low accurate inertial sensor is used for achieving a high accurate integration solution due to the aiding of global positioning system measurement.

[1] Van Dierendonck, A.J. (Chapter 8 author), *"GPS Receivers" IN Chapter* 8 of *Global Positioning System: Theory and Applications,* Volume 1, AIAA, Inc., 1996, P.356. [2]Ibid., P.363.

What is claimed is:

1. An improved vehicle positioning system, comprising:
a global positioning system (GPS) processor for providing GPS measurements including pseudorange, carrier phase, and Doppler shift;
an inertial measurement unit (IMU) for providing inertial measurements including body angular rates and specific forces;
a central navigation processor, which are connected with said GPS processor and said IMU, comprising an inertial navigation system (INS) processor, a Kalman filter, a and a carrier phase integer ambiguity resolution module; and
an input/output (I/O) interface connected to said central navigation processor;
wherein said GPS measurements are passed to said central navigation processor and said inertial measurements are injected into said inertial navigation system (INS) processor;
wherein an output of said INS processor and said GPS measurements are blended in said Kalman filter; an output of said Kalman filter is fed back to said INS processor to correct an INS navigation solution outputting from said central navigation processor to said I/O interface;
wherein said INS processor provides velocity and acceleration data injecting into a micro-processor of said GPS processor to aid code and carrier phase tracking of GPS satellite signals;
wherein an output of said micro-processor of said GPS processor, an output of said INS processor and an output of said Kalman filter are injected into said carrier phase integer ambiguity resolution module to fix global positioning system satellite signal carrier phase integer ambiguity number;
wherein said carrier phase integer ambiguity resolution module outputs carrier phase integer number into said Kalman filter to further improve positioning accuracy and said INS processor outputs navigation data to said I/O interface;

wherein said microprocessor of said GPS processor outputs pseudorange, Doppler shifts, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using a quaternion method wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

2. An improved vehicle positioning system, as recited in claim 1, wherein after computation of said position and velocity, said position and velocity errors calculated by said Kalman filter are used in said attitude position velocity computation module to correct said inertial solution.

3. An improved vehicle positioning system, as recited in claim 2, wherein said attitude errors computed by said Kalman filter is sent to said attitude position velocity computation module to perform attitude correction in said attitude position velocity computation module.

4. An improved vehicle positioning system, as recited in claim 2, wherein said attitude errors computed by said Kalman filter is sent to said transformation matrix computation module to perform said attitude correction before said attitude position velocity computation module.

5. An improved vehicle positioning system, as recited in claim 2, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

6. An improved vehicle positioning system, as recited in claim 3, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

7. An improved vehicle positioning system, as recited in claim 4, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information are sent to said I/O interface which provides a navigation data source for avionics systems onboard a vehicle.

8. An improved vehicle positioning system, as recited in one of claims 1 to 7, wherein said Kalman filter is a robust Kalman filter for providing near-optimal performance over a large class of process and measurement models and for blending GPS measurements and said inertial sensor measurements, wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting a multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

9. An improved vehicle positioning system, as recited in one of claims 1 to 7, wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

10. An improved vehicle positioning system, as recited in claim 9, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a global positioning system satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

11. An improved vehicle positioning system, comprising:
   a global positioning system (GPS) processor for providing GPS measurements including pseudorange, carrier phase, and Doppler shift;
   an inertial measurement unit (IMU) for providing inertial measurements including body angular rates and specific forces;
   a central navigation processor, which are connected with said GPS processor and said IMU, comprising an inertial navigation system (INS) processor, a robust Kalman filter, and a carrier phase integer ambiguity resolution module; and
   an input/output (I/O) interface connected to said central navigation processor;
   wherein said GPS measurements are passed to said central navigation processor and said inertial measurements are injected into said inertial navigation system (INS) processor;
   wherein an output of said INS processor and said GPS measurements are blended in said robust Kalman filter;

an output of said robust Kalman filter is fed back to said INS processor to correct an INS navigation solution outputting from said central navigation processor to said 1/0 interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said robust Kalman filter are injected into said carrier phase integer ambiguity resolution module to fix global positioning system satellite signal carrier phase integer ambiguity number;

wherein said carrier phase integer ambiguity resolution module outputs carrier phase integer number into said robust Kalman filter to further improve positioning accuracy and said INS processor outputs navigation data to said I/O interface;

wherein said robust Kalman filter, which is adapted for providing near-optimal performance over a large class of process and measurement models and for blending GPS measurements and said inertial sensor measurements, comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting a multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

12. An improved vehicle positioning system, comprising:

a global positioning system (GPS) processor for providing GPS measurements including pseudorange, carrier phase, and Doppler shift;

an inertial measurement unit (IMU) for providing inertial measurements including body angular rates and specific forces;

a central navigation processor, which are connected with said GPS processor and said IMU, comprising an inertial navigation system (INS) processor, a robust Kalman filter, and a carrier phase integer ambiguity resolution module; and an input/output (I/O) interface connected to said central navigation processor;

wherein said GPS measurements are passed to said central navigation processor and said inertial measurements are injected into said inertial navigation system (INS) processor;

wherein an output of said INS processor and said GPS measurements are blended in said robust Kalman filter; an output of said robust Kalman filter is fed back to said INS processor to correct an INS navigation solution outputting from said central navigation processor to said I/O interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said robust Kalman filter are injected into said carrier phase integer ambiguity resolution module to fix global positioning system satellite signal carrier phase integer ambiguity number;

wherein said carrier phase integer ambiguity resolution module outputs carrier phase integer number into said robust Kalman filter to further improve positioning accuracy and said INS processor outputs navigation data to said I/O interface;

wherein said microprocessor of said GPS processor outputs pseudorange, Doppler shifts, global positioning system satellite ephemeris, and atmosphere parameters to said robust Kalman filter;

wherein said robust Kalman filter, which is adapted for providing near-optimal performance over a large class of process and measurement models and for blending GPS measurements and said inertial sensor measurements, comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting a multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

13. An improved vehicle positioning system, comprising:

a global positioning system (GPS) processor for providing GPS measurements including pseudorange, carrier phase, and Doppler shift;

an inertial measurement unit (IMU) for providing inertial measurements including body angular rates and specific forces;

a central navigation processor, which are connected with said GPS processor and said IMU, comprising an inertial navigation system (INS) processor, a robust Kalman filter, and a carrier phase integer ambiguity resolution module; and an input/output (I/O) interface connected to said central navigation processor;

wherein said GPS measurements are passed to said central navigation processor and said inertial measurements are injected into said inertial navigation system (INS) processor;

wherein an output of said INS processor and said GPS measurements are blended in said robust Kalman filter; an output of said robust Kalman filter is fed back to said INS processor to correct an INS navigation solution outputting from said central navigation processor to said I/O interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said robust Kalman filter are injected into said carrier phase integer ambiguity resolution module to fix global positioning system satellite signal carrier phase integer ambiguity number;

wherein said carrier phase integer ambiguity resolution module outputs carrier phase integer number into said robust Kalman filter to further improve positioning accuracy and said INS processor outputs navigation data to said I/O interface;

wherein said microprocessor of said GPS processor outputs pseudorange, Doppler shifts, global positioning system satellite ephemeris, and atmosphere parameters to said robust Kalman filter;

wherein said INS processor processes said inertial measurements, which are body angular rates and specific forces, and said position error, velocity error, and attitude error coming from said robust Kalman filter to derive said corrected navigation solution;

wherein said robust Kalman filter, which is adapted for providing near-optimal performance over a large class of process and measurement models and for blending GPS measurements and said inertial sensor measurements, comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting a multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

14. An improved vehicle positioning system, comprising:

a global positioning system (GPS) processor for providing GPS measurements including pseudorange, carrier phase, and Doppler shift;

an inertial measurement unit (IMU) for providing inertial measurements including body angular rates and specific forces;

a central navigation processor, which are connected with said GPS processor and said IMU, comprising an inertial navigation system (INS) processor, a Kalman filter, and a carrier phase integer ambiguity resolution module; and an input/output (I/O) interface connected to said central navigation processor;

wherein said GPS measurements are passed to said central navigation processor and said inertial measurements are injected into said inertial navigation system (INS) processor;

wherein an output of said INS processor and said GPS measurements are blended in said Kalman filter; an output of said Kalman filter is fed back to said INS processor to correct an INS navigation solution outputting from said central navigation processor to said I/O interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said Kalman filter are injected into said carrier phase integer ambiguity resolution module to fix global positioning system satellite signal carrier phase integer ambiguity number;

wherein said carrier phase integer ambiguity resolution module outputs carrier phase integer number into said Kalman filter to further improve positioning accuracy and said INS processor outputs navigation data to said I/O interface;

wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

15. An improved vehicle positioning system, as recited in claim 14, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a global positioning system satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

16. An improved vehicle positioning system, comprising:

a global positioning system (GPS) processor for providing GPS measurements including pseudorange, carrier phase, and Doppler shift;

an inertial measurement unit (IMU) for providing inertial measurements including body angular rates and specific forces;

a central navigation processor, which are connected with said GPS processor and said IMU, comprising an inertial navigation system (INS) processor, a Kalman filter, and a carrier phase integer ambiguity resolution module; and an input/output (I/O) interface connected to said central navigation processor;

wherein said GPS measurements are passed to said central navigation processor and said inertial measurements are injected into said inertial navigation system (INS) processor;

wherein an output of said INS processor and said GPS measurements are blended in said Kalman filter; an output of said Kalman filter is fed back to said INS processor to correct an INS navigation solution outputting from said central navigation processor to said I/O interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said Kalman filter are injected into said carrier phase integer ambiguity resolution module to fix global positioning system satellite signal carrier phase integer ambiguity number;

wherein said carrier phase integer ambiguity resolution module outputs carrier phase integer number into said Kalman filter to further improve positioning accuracy and said INS processor outputs navigation data to said I/O interface;

wherein said microprocessor of said GPS processor outputs pseudorange, Doppler shifts, global positioning system satellite ephemeris, and atmosphere parameters to said Kalman filter;

wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

17. An improved vehicle positioning system, as recited in claim 14, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a global positioning system satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

18. An improved vehicle positioning system, comprising:

a global positioning system (GPS) processor for providing GPS measurements including pseudorange, carrier phase, and Doppler shift;

an inertial measurement unit (IMU) for providing inertial measurements including body angular rates and specific forces;

a central navigation processor, which are connected with said GPS processor and said IMU, comprising an inertial navigation system (INS) processor, a Kalman filter, and a carrier phase integer ambiguity resolution module; and an input/output (I/O) interface connected to said central navigation processor;

wherein said GPS measurements are passed to said central navigation processor and said inertial measurements are injected into said inertial navigation system (INS) processor;

wherein an output of said INS processor and said GPS measurements are blended in said Kalman filter; an output of said Kalman filter is fed back to said INS processor to correct an INS navigation solution outputting from said central navigation processor to said I/O interface;

wherein said INS processor provides velocity and acceleration data injecting into a micro-processor of said GPS processor to aid code and carrier phase tracking of GPS satellite signals;

wherein an output of said micro-processor of said GPS processor, an output of said INS processor and an output of said Kalman filter are injected into said carrier phase integer ambiguity resolution module to fix global positioning system satellite signal carrier phase integer ambiguity number;

wherein said carrier phase integer ambiguity resolution module outputs carrier phase integer number into said Kalman filter to further improve positioning accuracy and said INS processor outputs navigation data to said I/O interface;

wherein said microprocessor of said GPS processor outputs pseudorange, Doppler shifts, global positioning system satellite ephemeris, and atmosphere parameters to said Kalman filter;

wherein said INS processor processes said inertial measurements, which are body angular rates and specific forces, and said position error, velocity error, and attitude error coming from said Kalman filter to derive said corrected navigation solution;

wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

19. An improved vehicle positioning system, as recited in claim 14, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a global positioning system satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

* * * * *

UNITED STATES PATENT AND TRADEMARK OFFICE
CERTIFICATE OF CORRECTION

PATENT NO. : 6,167,347
DATED : December 26, 2000
INVENTOR(S) : Ching-Fang Lin

It is certified that error appears in the above-identified patent and that said Letters Patent is hereby corrected as shown below:

In Column 7, line 2, after "sideband modulator", insert --...--.

Signed and Sealed this

Twenty-ninth Day of May, 2001

Attest:

NICHOLAS P. GODICI

*Attesting Officer*     *Acting Director of the United States Patent and Trademark Office*